US009955294B2

(12) United States Patent
Lee et al.

(10) Patent No.: US 9,955,294 B2
(45) Date of Patent: *Apr. 24, 2018

(54) AIRCRAFT CONTAINER TRACKING DEVICE

(71) Applicant: Senaya, Inc., Boston, MA (US)

(72) Inventors: Brian Lee, Boston, MA (US); Jamshed Dubash, Shrewsbury, MA (US); Jahangir Nakra, Titusville, NJ (US)

(73) Assignee: Senaya, Inc., Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,677

(22) Filed: Apr. 23, 2015

(65) Prior Publication Data

US 2016/0205500 A1 Jul. 14, 2016

Related U.S. Application Data

(60) Provisional application No. 62/102,844, filed on Jan. 13, 2015.

(51) Int. Cl.
*H04W 24/00* (2009.01)
*H04W 4/02* (2018.01)

(52) U.S. Cl.
CPC .................................... *H04W 4/02* (2013.01)

(58) Field of Classification Search
CPC ......... H04M 1/72519; H04M 1/72544; H04M 1/72572; H04W 12/08; H04W 4/02; H04W 4/021; H04W 4/023; H04W 4/025; H04W 4/206; H04W 64/00; H04W 64/003; H04W 68/12; H04W 88/06

USPC ................. 455/127.5, 456.1, 456.4, 456.5
See application file for complete search history.

(56) References Cited

U.S. PATENT DOCUMENTS

| 7,072,668 | B2* | 7/2006 | Chou | G01S 5/0027 |
| | | | | 342/357.4 |
| 8,538,458 | B2* | 9/2013 | Haney | H04W 12/08 |
| | | | | 455/456.1 |
| 9,607,281 | B2* | 3/2017 | Lee | G06Q 10/0833 |
| 2004/0155963 | A1* | 8/2004 | Kondo | G05B 15/02 |
| | | | | 348/180 |
| 2010/0033424 | A1* | 2/2010 | Kabasawa | G01C 17/28 |
| | | | | 345/156 |
| 2012/0229440 | A1* | 9/2012 | Rao | G06F 1/3206 |
| | | | | 345/211 |

(Continued)

Primary Examiner — Joseph Arevalo
(74) Attorney, Agent, or Firm — Holzer Patel Drennan

(57) ABSTRACT

A wireless transmitter device that has a baseline 'off' status, turning its data transmission module 'on' only under certain specific circumstances, thus allowing the device to be used on aircraft without concern of the device activating and transmitting location data that might interfere with the aircraft navigation and/or communication systems. The data transmission module may be turned on manually (i.e., manual activation), may be activated based on time (i.e., time-based activation), or may be activated based on motion (i.e., motion-based activation). Activation of the data transmission module occurs only after it has been determined that it is safe to activate the module(s), for example, if no motion of the device has been sensed for a predetermined period of time. Only after the device has assuredly determined that the aircraft is in a mode where data transmission is allowed (e.g., not in flight) is the data transmission module activated.

8 Claims, 3 Drawing Sheets

(56) References Cited

U.S. PATENT DOCUMENTS

| | | | | |
|---|---|---|---|---|
| 2013/0157655 A1* | 6/2013 | Smith, II | .............. | H04W 88/06 455/426.1 |
| 2013/0190943 A1* | 7/2013 | Wester | ...................... | G05F 5/00 700/297 |
| 2013/0229491 A1* | 9/2013 | Kim | ........................ | G06F 3/017 348/46 |
| 2013/0321122 A1* | 12/2013 | Lee | ........................ | G01S 5/0009 340/3.1 |
| 2014/0184804 A1 | 7/2014 | Lee et al. | | |
| 2014/0187261 A1 | 7/2014 | Lee et al. | | |
| 2014/0235188 A1 | 8/2014 | Lee et al. | | |

\* cited by examiner

AIRCRAFT CONTAINER TRACKING DEVICE

CROSS-REFERENCE TO RELATED APPLICATION

This application claims priority to U.S. provisional application 62/102,844 filed Jan. 13, 2015, the entire disclosure of which is incorporated herein for all purposes.

FIELD OF THE DISCLOSURE

The present disclosure is directed to wireless asset tracking devices and systems for use with aircraft and/or at airports.

BACKGROUND

In industry nowadays, success or failure depends in part upon knowing the up-to-date status of various assets. For example, in the freight delivery business, up-to-date knowledge of the location and, in some instances, the environment of various assets, such as pallet goods, is critical to efficient and reliable operations. Failure to maintain up-to-date status information can result in temporarily lost assets, sub-optimal use of the assets, and in the case of freight delivery, missed or late deliveries. A wireless tracking device or system is highly beneficial for solving the dilemma of knowing the physical location of the asset at a set point in time.

Federal Aviation Regulation (FAR) Sec. 91.21 restricts the use and operation of wireless communication circuitries and other portable electronic devices (PEDs) aboard aircraft unless it has been previously determined that the specific PED will not cause interference with the navigation and communication system of the aircraft. This covers many RF generating PEDs, including those that transmit RF (T-PED).

Extreme care must be taken when using RF and/or cellular based wireless tracking devices in aircraft to assure that the device does not activate at an inappropriate time.

SUMMARY

This disclosure is directed to a wireless RF transmitter device that has a baseline 'off' status, turning its data transmission module(s) 'on' only under certain specific circumstances, thus allowing the device to be used on aircraft cargo without concern of the device activating and transmitting a location data 'ping' that might interfere with the aircraft navigation and/or communication systems. The data transmission module(s) may be turned on manually (i.e., manual activation), may be activated based on time (i.e., time-based activation), may be activated based on motion (i.e., motion-based activation), or by a combination. Activation of the data transmission module(s) (i.e., the manual, time-based, and/or motion-based activation) occurs only after it has been determined that it is safe to activate the module(s), for example, if no motion of the device has been sensed for a predetermined period of time. That is, only after the device has assuredly determined that the aircraft is in a mode where data transmission is allowed (e.g., not in flight) can the data transmission module(s) be activated.

This disclosure provides, in one particular embodiment, a wireless tracking device having at least one of an RF communication module and/or a cellular communication module, all of the communication modules being in a data transmission 'off' mode until activated either manually, based on time, and/or based on movement.

This disclosure also provides, in another particular embodiment, a wireless tracking device having at least a motion sensor, a vision sensor, various environmental sensor(s) that together determine the location of the device in relation to an aircraft and determine the status or mode of the aircraft, that is, whether data transmission is allowed (e.g., not in flight), in order to activate a data transmission module(s).

In another particular embodiment, this disclosure provides a wireless tracking device configured to activate a communication module only after the device has confirmed that the device is in a mode where communication is allowed.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

Figure 1:
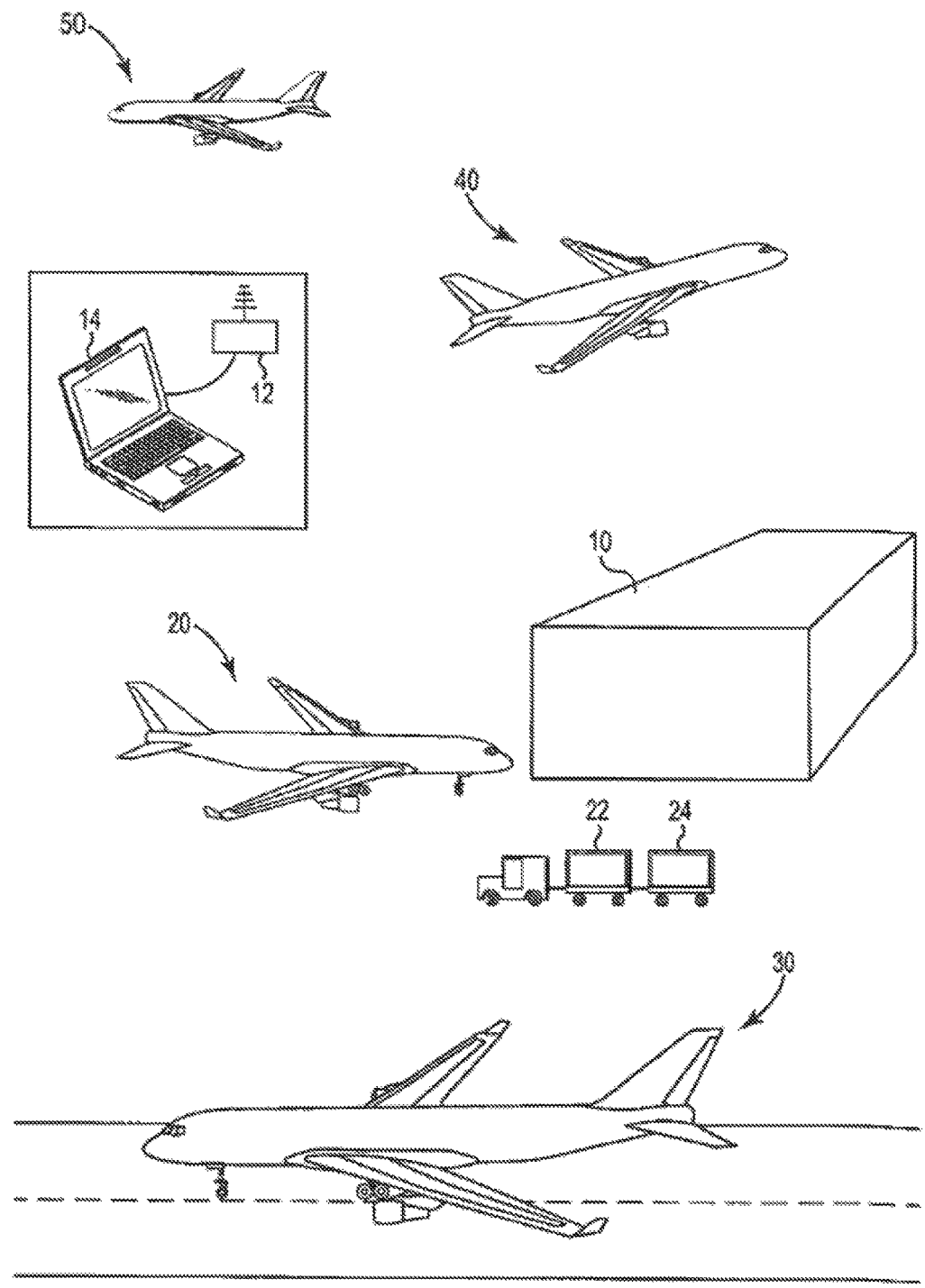
FIG. 1 is a schematic diagram of an airport environment, illustrated aircraft in various modes.

A wireless tracking system is highly beneficial in knowing the physical location of an asset at a set point in time. This is particularly beneficial for aircraft cargo. However, tracking systems and tracking devices designed for use with aircraft cargo must be specially designed to comply with FAA requirements; the device must not send a data ping under certain conditions.

Prior art tracking systems have gone to great lengths to provide devices that shut off when the device is located in or near an aircraft. These devices typically have multiple motion sensors, light sensor(s), accelerometer(s), gyroscope(s), etc. to detect when the device has been placed within a cargo hold of an aircraft and to detect motion of the aircraft. Often, these devices generate many false negatives and false positives due to variation of aircraft engine operation and environment. Additionally, with all the various sensors and electronics needed to monitor those sensors, the possibility of failure always exists. There is an ever-increasing demand for a tracking devices and tracking systems for aircraft containers that comply with FAA requirements without human intervention and that are reliable.

The devices of the present disclosure provide fault-free operation to comply with FAA regulations. The devices have an 'always off' baseline status for the data transmission module(s); the data transmission module(s) of the devices turn on only when specifically instructed to turn on, and only after the device has verified that that device is stationary or not moving. Additionally, if any interruption of power or other mechanism occurs, the devices have a fail-safe 'always off' status.

The systems and devices utilize at least one data transmission module; preferably, the devices include both an RF communication module and a cellular communication module. The systems and devices can be operated on a global basis regardless of cellular infrastructure since most aircraft fly across and throughout countries where basic cellular infrastructure may vary from CDMA to GSM, from 2G to 4G LTE. The devices include an array of machine vision sensor(s) and/or inertia (motion) sensor(s) to detect movement of the cargo on which the device is positioned. In some embodiments, the sensor array has only a vision sensor or only motion sensor(s). The sensor array (e.g., the machine vision sensor(s) and/or the motion sensor(s)) detects the status of the aircraft (e.g., off, idling, take-off mode, taxiing, landing-mode, etc.) and optionally the location of the cargo in relation to the aircraft (e.g., within the cargo hold). In some embodiments of the devices, no battery is required in the tracking devices, thus virtually eliminating the need for external battery charging or replacement.

In this discussion, a "tracking device," "transmitter device," and variations thereof refer to a portable, signal emitting device configured for placement in or on an asset to be tracked, such as a container of goods. A "tracking system" and variations thereof includes at least one tracking or transmitter device, and a receiver for receiving the location signal from the tracking transmitter device(s).

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

FIG. 1 schematically illustrates an airport environment, showing aircraft in different stages or modes of operation. The tracking systems and devices of this disclosure are particularly configured to operate in an airport environment, comply with FAA regulations, operate globally with enhanced safety features, and operate without human intervention.

In FIG. 1, a cargo terminal 10 is illustrated with an aircraft 20 parked in close proximity thereto; aircraft 20 may be, for example, parked with all engines off or may be idling. Aircraft 20 is in the process of being loaded with cargo containers 22, 24 that have attached thereto transmitter devices, or tracking devices, in accordance with this disclosure. Located in a remote location, for example within terminal 10 or in an office building remote from the airport, is a receiver 12 operably connected to a display screen or monitor 14 (e.g., a computer). Receiver 12 is operably connected to a network, as will be described below. The tracking system, which includes receiver 12 and at least one tracking or transmitter device, uses an established wireless communication network (not illustrated) to receive information on the location of the transmitter device and convey that information to display 14.

The transmitter device is secured to container 22, 24. In some embodiments, the transmitter device may be secured to the container, be in the container, or be secured to a pallet on which the container is positioned; in other embodiments, the transmitter device is embedded or otherwise permanently affixed to the container or pallet; whereas in yet other embodiments the transmitter device is removable from the container or pallet. The device is preferably positioned so that no operators, equipment, adjacent containers, etc. can access the transmitter device during normal movement of the device and remove, damage or otherwise hinder the operation of the device.

FIG. 1 also illustrates an aircraft 30 in a taxiing mode, an aircraft 40 in a take-off mode, and aircraft 50 at cruise altitude. Each of these aircraft 30, 40, 50 includes cargo containers tagged with a transmitter device according to this disclosure.

These transmitter devices (on containers 22, 24, in aircraft 30, 40, 50 and in aircraft 20, if any) have an 'off' base status, the devices having their data transmission features (e.g., module(s)) turned off and activated only when specifically instructed to turn on; these devices differ from prior art transmitter devices, which have an elaborate system of sensors and equipment to turn the devices off. The data transmission module(s) of the transmitter devices may be turned on manually (i.e., manual activation such as by a push button), may be activated based on time (i.e., time-based activation), or may be activated based on motion (i.e., motion-based activation). Activation of the data transmission module(s) occurs only after confirmation that the aircraft is in a mode that allows transmission ("ping mode"); in other words, only after the device has assuredly determined that the aircraft is in a ping mode that allows data transmission (e.g., not in flight) will the data transmission module(s) be activated. For example, the module(s) may activate only after no motion of the device has been sensed for a predetermined period of time, for example, in aircraft 20 parked at the cargo terminal. Thus, the data transmission module(s) in aircraft 30, 40, 50 will not turn on or activate contrary to FAA regulations.

Because the FAA restricts the use of RF wireless communication and cellular wireless communication during various stages of aircraft operation, to avoid potential interference with the navigation and communication systems of the aircraft, the tracking devices have their data transmission features (module(s)) turned off at all times unless specifically activated when it has been determined to be safe. When the devices are in active data transmission mode, some embodiments of the devices are configured to switch between various communication networks, depending on the status of the aircraft, in compliance with FAA regulations and other regulatory requirements. For example, the transmission module may be an RF module, or a cellular-based communication module; the different transmission module can be used at different times or locations. Aircraft, in general, have dynamic and frequent changes in their route and business environment and the tracking device and system is configured to function throughout the aircraft's route.

The tracking system can utilize established position locating technology, such as Global Positioning System (GPS), any global navigation satellite system (GNSS) such as GLONASS or Galileo, or a compass navigation system, to determine the position of the device. The tracking system can rely on established, technically mature, wireless communication network(s) such as CDMA/GMS, ZigBee, (Low Energy) Bluetooth (LBT), WiFi (sometimes referred to as WLAN), LTE, and WiMax, and also CDMA (Code Divisional Multiple Access) and/or GSM (Global System for Mobile Communication) to relay the position of the asset being tracked. By utilizing globally available communication networks, the need for infrastructure such as WiFi routers and relays in each airport is avoided.

Figure 2:
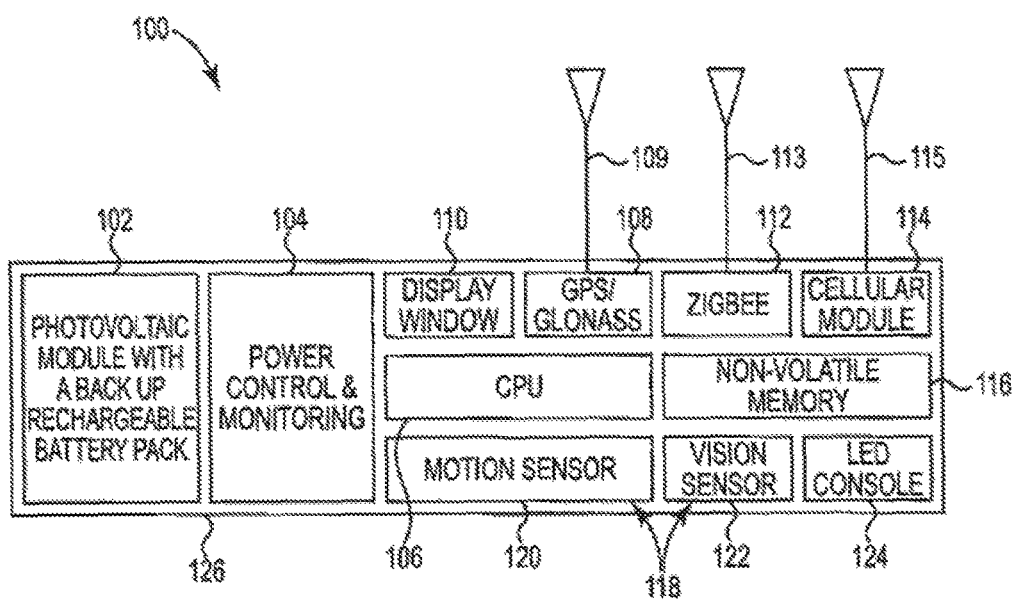
FIG. 2 is a schematic block diagram of an example of a wireless tracking device.

FIG. 2 illustrates an example embodiment of a tracking or transmitter device 100 that has an 'off' baseline status for the data transmission module(s); at least one device 100, together with receiver 12, forms a tracking system. Device 100 includes a power source 102, which may be a single use battery or a rechargeable battery. Examples of suitable batteries include NiCad, lithium, lithium-ion, zinc-carbon, and alkaline batteries. For example, a 3.7V battery could be used, although it is understood that other voltage batteries could be used. In FIG. 2, power source 102 includes a rechargeable battery pack and a photovoltaic module to recharge the battery pack when needed. Other power source rechargers or regenerators could be utilized, including inductive coil, a USB power-line, and mechanical energy harvesting mechanisms.

Electrically connected to power source 102 is a power module 104 that includes a battery level monitor and a power control, which in turn is operably connected to a computer chip or CPU 106. Together CPU 106 and power module 104 activate and deactivate various elements of device 100, based on the status of the aircraft in which device 100 is located. Transmitter device 100 also includes a positioning element, in this embodiment a GPS/GLONASS positioning element 108 connected to an antenna 109, which may be an internal antenna or an external antenna. Positioning element 108 provides data to transmitter device 100 regarding its physical location.

Transmitter device 100 transmits information or data, such as its location, in the form of a "ping" to display 14 via a wireless network when activated; the information or data may also be provided to a display 110 on device 100. In some embodiments, transmitter device 100 has two-way communication with receiver 12. That is, transmitter device 100 transmits information (i.e., a data ping) and also receives information from receiver 12. Further, transmitter device 100 may receive instructions, such as to acknowledge that device 100 is active and ready and to transmit the location information. Having received those instructions, device 100 can send back to receiver 12 acknowledgements that the communication was received and acted on.

As indicated, the transmitter device is configured to send and optionally receive data via a wireless network. Device 100 of FIG. 2 is configured with a ZigBee transmission module 112 to connect to receiver 12 via a ZigBee network and communicate data to display 14. An alternate embodiment of a transmitter device can utilize a ZigBee/LBT module and a corresponding ZigBee/LBT network. Additionally, transmitter device 100 may include a data receiver (not shown), such as an infrared data link (IrDA), to provide a second communication means to device 100, as an alternate or back-up to module 112. An IRDA includes an optical window formed from an IR transparent material, such as glass, to allow infra red radiation or energy to pass to and from the IrDA.

Device 100 also includes a cellular communication module 114, which may be CDMA (Code Divisional Multiple Access) and/or GSM (Global System for Mobile Communication) module, configured to connect to receiver 12 via either a CDMA or GSM network and communicate data to display 14. Modules 112, 114, respectively, have an antenna 113, 115 which may optionally include a power amplifier to extend the range of the signal from modules 112, 114. In some embodiments, modules 112, 114 may be combined into a single physical module rather than two separate or distinct modules.

Together, modules 112, 114 provide the communication basis for transmitter device 100 to receiver 12 and display 14. Module 112, which connects device 100 to a wireless RF network, can be utilized when FAA regulations allow use of RF communications, and module 114, which connects device 100 to a cellular network, can be utilized when FAA regulations do not allow the use of RF communications yet do allow cellular communications.

Any of the data or information regarding device 100, such as its position as determined by positioning element 108, alarm information, battery level information, etc., can be stored in a memory 116 of device 100, which may be a permanent memory or a rewritable memory. Data from memory 116 may be transmitted to receiver 12 or may be retained in memory 116 until manually retrieved.

Tracking device 100 includes a sensor array 118 to determine the location of device 100 in relation to an aircraft and to determine the status or mode of the aircraft, in order to determine when to activate the data transmission modules 112, 114.

Sensor array 118 includes a motion sensor 120. Motion sensor 120 may be a multiple-degree-of-freedom (DOF) device (e.g., 10 DOF) and may include any or all of a gyroscope, an accelerometer, a magnetometer, and an altitude sensor. With the various multiple degrees of freedom, device 100 can distinguish among various movements, orientations and locations, such as lateral motion, acceleration, inclined or declined motion, and altitude. With this information, device 100 can determine the aircraft's status, e.g., parked, idling, taxiing, take-off, cruising at altitude, landing, etc.

Sensor array 118 also includes a machine vision sensor 122. Machine vision sensor 122 applies image processing to images captured by an integral camera and calculates the characteristics of an object, such as its area, center of gravity, length, or position, and outputs the data or judgment results. Examples of objects vision sensor 122 can detect, when incorporated into tracking device 100, include an aircraft door, movement of a conveyer belt, sunlight entering through the aircraft door, and curvature of the cargo hold. Vision sensor 122 is selected to have a high dynamic range (HDR>120 dB), high frame rate (at least FRS>100 frame per second, in some embodiments FRS>120 or even>140), a global shutter (to minimize smearing and distortion of images), and preferably, a low cost CMOS Image Sensor to capture the entrance and exiting event of a container from an airplane door. Vision sensor 122 can be configured with UV protected lenses with IR (Infra-Red) sensing capability for night vision detection. This sensor may also work as a light sensor to detect indoor light. Vision sensor 122 may be equipped with an auto-focus and anti-shaking frame. A normally closed mechanical on/off shutter may be included to avoid direct exposure of sensor 122 to sunlight when not in use, such as during a sleep mode.

Unlike motion sensor 120, which is active at all times during the operational time, vision sensor 122 is usually in a default sleep mode to save power. Vision sensor 122 is woken up (or activated) by a signal from motion sensor 120 when a movement above a threshold level is detected by motion sensor 120. Once in the cargo hold, machine vision sensor 122 can confirm whether or not device 100 is in fact in the cargo hold, by evaluating, for example, the cargo hold curvature, the shape of the door, or sunlight entering through the door to the hold. If in the cargo hold, in some embodiments, device 100 confirms that modules 112, 114 are deactivated.

Sensor array 118 also includes at least one environmental sensor 123, often multiple environmental sensors 123. Examples of suitable environmental sensors 123 for device 100 include an acoustic sensor, a frequency detector, an inductive sensor, and an ultrasonic sensor. The various environmental sensor(s) 123 may be used individually or in any combination to make the detection regarding whether or not device 100 is in the cargo hold.

An acoustic sensor, if present, can detect characteristics of the sound and vibration in the aircraft, since an aircraft generally generates a substantial amount of vibration and unique sound waves. By placing an acoustic sensor into tracking device 100, distinctive sounds made in the air and/or through the body of the aircraft are captured when the engines or jets of the aircraft are operating, such as during the pre-flight checks, taxi, and takeoff. Once the acoustic sensor signals are represented in the frequency domain, this representation is communicated to the CPU 106, which compares the frequency and amplitude of the detected signal pattern with that of a pre-defined jet engine and/or aircraft engine signal pattern stored in memory. Device 100 activates its aircraft mode when the signal patterns match or fall within a predefined range.

A frequency detector can additionally or alternately be used to determine if tracking device 100 is inside the aircraft by detecting frequencies emitted by the aircraft during its normal operation. For example, an aircraft with jet engines produces specific frequencies during operations, such as take off, landing, taxiing, and pre-flight checks. When a spectrum analysis of the signal from the frequency detector is received by CPU 106 and identified as a recognized frequency, device 100 activates its aircraft mode.

An inductive sensor can additionally or alternately be used to determine if the container on which tracking device 100 is positioned is inside the aircraft by detecting an inductive change of the container. When the container is placed into the aircraft, the container is placed into a cargo hold. The container is constructed to conform to the dimensions of the cargo hold to reduce or eliminate any non-usable space. Therefore, the containers are often placed in proximity to or against the inner walls of the cargo hold. The body or fuselage of the aircraft is typically made from special materials with a defined thickness and other characteristics that affect the inductance of the container when it is placed in close proximity thereto. CPU 106 compares an inductive change with values stored in memory representative of the conductance of an aircraft body, to determine when the container is loaded onto the aircraft so as to initiate the activation of aircraft mode.

An ultrasonic or ultrasound sensor can additionally or alternately be used to determine if the container is inside the aircraft by detecting the proximity of tracking device 100 to the inner wall of the cargo hold. An ultrasound wave from the sensor will travel a short distance to the body of the aircraft. CPU 106 compares the measured ultrasound wave travel distance with values stored in its memory representative of the spacing between the container and an aircraft body (to which the container would be proximate if loaded onto the aircraft), to determine when the container is loaded onto the aircraft, and thus activate the aircraft mode.

Unlike motion sensor 120, which is active at all times during the operational time, environmental sensors 123 are usually in a default sleep mode to save power. Environmental sensors 123 are woken up or activated by a signal from motion sensor 120 when a movement above a threshold level is detected by motion sensor 120. Once in the cargo hold, environmental sensors 123 can confirm whether or not device 100 is in fact in the cargo hold, by evaluating, for example, distinctive sounds made in the air and/or through the body of the aircraft, detecting frequencies emitted by the aircraft, or proximity of the container to the cargo hold. If in the cargo hold, in some embodiments, device 100 confirms that modules 112, 114 are deactivated.

Device 100 may also include an indicator console 124 having various operational switches, gauges, buttons, and/or lights (e.g., LED lights). Console 124 may include any number of optional features, such as an audio alarm to indicate any number of problems or malfunctions, such as low battery level, unauthorized movement (as sensed by motion sensor 120), or tampering with device 100. Device 100 may include a temperature gauge or a temperature sensor.

The various elements that compose transmitter device 100 may be housed in an RF and/or cellular transmissive case 126, preferably one that is at least water resistant. Case 126 may be, or may include, a protective window transparent to visible and IR light.

Figure 3:
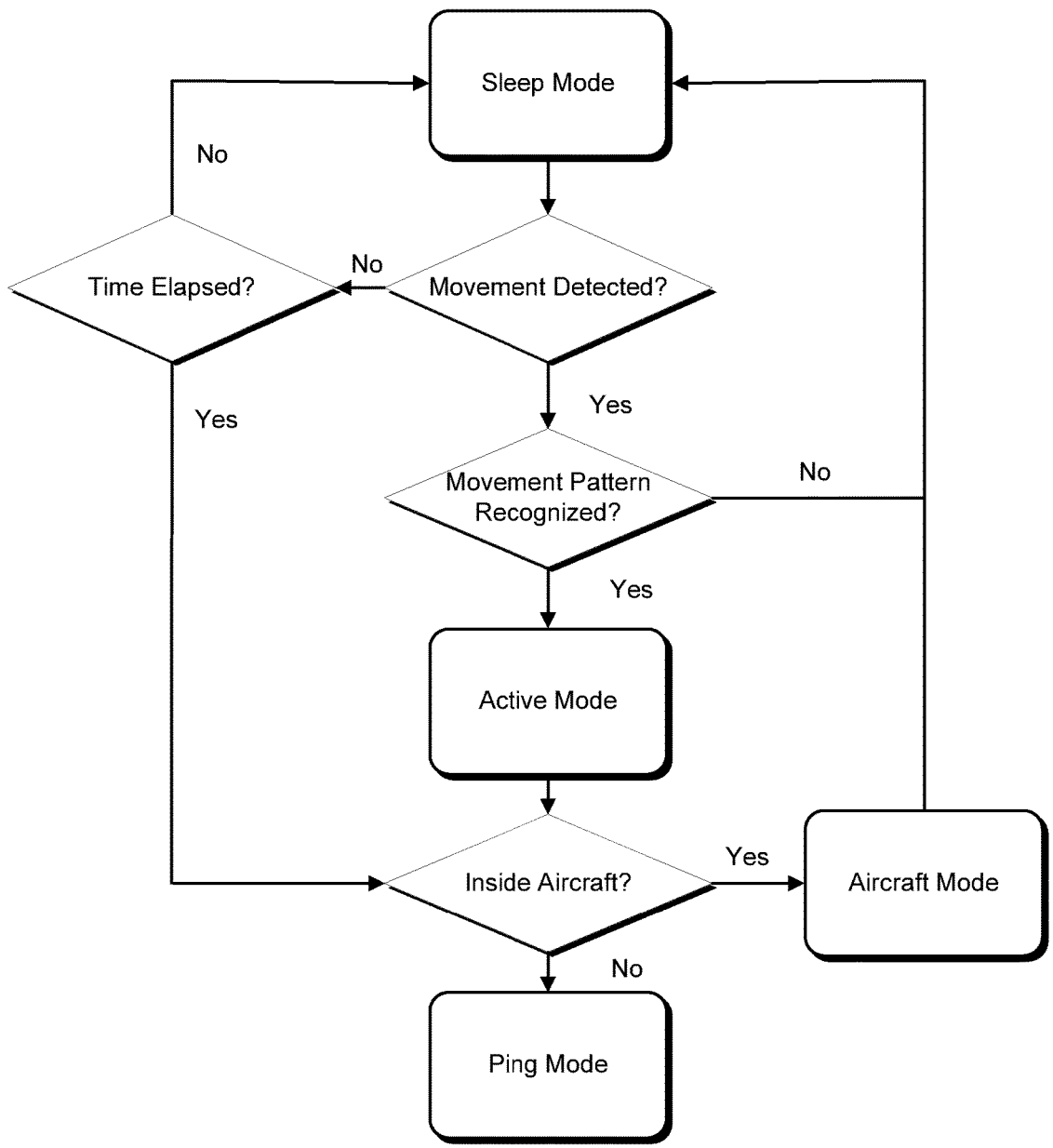
FIG. 3 is a flowchart diagram of an activation chart for a tracking device.

FIG. 3 shows an example flow diagram of activation of a tracking device, such as tracking device 100. Initially, the tracking or transmitter device is in sleep mode. The device wake-ups when movement is detected. If no movement is detected, the device checks if a preset timer T1 has expired. When the timer T1 has expired, the device goes to an active mode, where the device checks if the device is inside the aircraft using any or all of a motion threshold, vision sensor, and one of or combination of multiple environmental sensors. The time T1 is selected to be sufficiently close to (either physically or in time) the expected occurrence of a business event, for example 24 hours or 1 day, or 48 hours or 2 days. If the device is found outside the aircraft, the device goes into a ping mode where the device sends a data ping to a remote host. When a wireless transmitter (e.g., CDMA or ZigBee or WiFi) is unavailable, the data message is saved in an internal memory of the device for later use. Hereafter, the device goes to sleep mode.

When movement is detected, the motion sensor 120 then identifies a sequence of movements. Those sequences of motion may follow a certain pattern of movement, and generally this pattern is fixed or within a boundary condition. Those sequences are unique for every movement event, such as unloading, loading or other movement event. Typical loading and unloading movement sequences have been identified above. Therefore by recognizing this pattern of movements, one can not only predict a business event but also a gross location of the asset.

The motion threshold may be set either as a part of a SMART Ping™ algorithm (e.g., see for example, patent application Ser. Nos. 13/796,574 and 13/796,683, both filed Mar. 12, 2013, which are incorporated herein by reference) or as a predetermined pattern of movement. One exemplary pattern is a set combination of lateral motion followed by a vertical (or sliding up) motion, which is indicative of loading into a cargo hold. Another exemplary pattern is a set combination of lateral motion followed by decreasing vertical (or dropping) motion, which is indicative of unloading from a cargo hold. A SMART Ping™ algorithm utilizes movement and time to set the motion threshold. Additionally, a SMART Ping™ algorithm may utilize known or estimated occurrences of business events.

When the movement is unrecognized within the pattern of movement, or, if a predetermined time period has not elapsed, the tracking device goes to sleep mode. However, if the sequence of movement is within identified pattern of movement, tracking device 100 goes to active mode. Once the device 100 is in the active mode, one or more sensors determine the location of device 100 is relation to the aircraft and the aircraft's status, e.g., inside the aircraft, outside the aircraft, idle, pre-flight check, etc.

In some designs, in order to identify the aircraft's status, the motion sensor includes a motion recognition algorithm, which may be present in CPU 106 of device 100. The motion recognition algorithm includes appropriate programming or code to complete the following steps: data acquisition, segmentation, similarity search, similarity comparison, map identification and classification, and finally, send command. Preferably, motion sensor 120 is calibrated so that the sensor(s) correctly track the movement. Typically, the calibration is performed in the field every time when the tracking device goes into its maintenance stage. The procedure in which the sensor is calibrated is consistent and traceable.

In order to determine the location of tracking device 100 either inside or outside the aircraft, machine vision sensor 122 can capture the entrance and exiting event of a container from an airplane door. Machine vision sensor 122 may also work as a light sensor to detect indoor light. With a combination of image processing analysis present in the CPU 106 of tracking device 100, vision sensor 122 can identify the aircraft's status.

Individual or a combination of two or more of environmental sensors 123 such as an acoustic sensor, a frequency detector, an inductive sensor, and ultrasonic sensor, could additionally or alternately determine the location of tracking device 100 either inside or outside the aircraft. Other environmental sensors 123 such as a temperature sensor, a pressure sensor, and/or an oxygen sensor could additionally or alternately be present to determine the location or status of the aircraft.

The acoustic sensor captures sounds made in the air and/or through the body of the aircraft when the aircraft is operating, such as during the pre-flight checks, taxi, and takeoff, and compares the frequency and amplitude of the detected signal pattern with that of a pre-defined jet engine and/or aircraft engine signal pattern stored in memory. The frequency detector detects frequencies emitted by the aircraft during its normal operation such as take off, landing, taxiing, and preflight checks, and matches its frequency spectrum with recognized frequency. Activation of aircraft mode is then determined when the signal patterns match or fall within a predefined range. Both an inductive sensor and an ultrasonic sensor measure a close proximity of tracking device 100 in relation to an aircraft body to determine when the container is loaded onto the aircraft. A temperature sensor detects ambient temperature, a pressure sensor detects atmospheric pressure, and an oxygen sensor detects the amount of oxygen present. All of these sensors can detect when device 100 is at increased altitude (e.g., climbing or cruising).

When it is determined that the tracking device is in aircraft mode in which FAA regulations do not allow the use of RF communications or cellular communications, tracking device 100 goes into the sleep mode as shown in FIG. 3. Tracking device 100 can be initially programmed with current FAA regulations directed to RF and cellular communication, or can be configured to be manually programmed. It may be desired to have sufficient manual access to CPU 106 of device 100 to alter the deactivation and activation of modules 112, 114 based on new FAA regulations or when flying in regions of the world that might have different regulations.

As seen in FIG. 3, tracking device 100 goes into a ping mode when it has confirmed its location outside the aircraft. At this stage, when no movement is detected, tracking device 100 may send time-based pings to receiver 12 indicating its location and/or status; these pings may be sent via RF module 112 or cellular module 114. However, when movement is detected, the tracking device may send motion-based pings to receiver 12 indicating its location and/or status; these pings may be sent via RF module 112 or cellular module 114. Here after, tracking device 100 turns off its communication module(s) 112, 114. If a wireless communication mechanism or network (e.g., CDMA, GSM, ZigBee, LBT) is unavailable, the message (i.e., the data) is saved in an internal memory of the device for later transmittal. Hereafter, the device switches to a sleep mode. Motion sensor 120 and memory 116 remain on throughout the taxiing, take-off and cruising modes of the aircraft.

Any suitable computer usable or computer readable medium may be utilized for device 100 to deactivate and activate modules 112, 114, vision sensor 122, and/or environmental sensor 123. In the context of this disclosure, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wire line, optical fiber cable, radio frequency (RF) or other means.

As described above and illustrated in the figures, the present disclosure is directed to various implementations of a tracking device that has its communication transmission module(s) in a fail safe 'off' mode until a specific activation event. The data transmission module(s) of the tracking device may be turned on manually (i.e., manual activation), may be activated based on time (i.e., time-based activation), or may be activated based on motion (i.e., motion-based activation), and only after the device has been confirmed to be in a ping mode (e.g., not in flight).

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A wireless tracking device comprising at least one of an RF communication module and/or a cellular communication module, and a sensor array comprising a motion sensor always in an 'on' sensing mode, a vision sensor and environmental sensor(s);
   the vision sensor and environmental sensor(s) in a sensing 'off' mode until activated either manually, based on expiration of a timer, and/or based on movement above a threshold level, and
   all of the communication modules in a data transmission 'off' mode if determined by the vision sensor and/or the environmental sensor(s) that the tracking device is inside an aircraft, and at least one of the communication modules in a data transmission 'on' mode if determined by the motion sensor, vision sensor and/or the environmental sensor(s) that the device is outside the aircraft where communication is allowed.

2. The wireless tracking device of claim 1 further comprising a GPS positioning element.

3. The wireless tracking device of claim 1, comprising the RF communication module and the cellular communication module.

4. The wireless tracking device of claim 1, wherein the communication module is activated manually by an operator.

5. The wireless tracking device of claim 1, wherein the communication module is activated by a time-based algorithm.

6. The wireless tracking device of claim 1, wherein the communication module is activated by a movement-based algorithm.

7. The wireless tracking device of claim 1, wherein the communication module is activated based on a known or estimated business event.

8. A method for a wireless tracking device, comprising:
   initially having any RF communication module and any cellular communication module of the tracking device deactivated and a motion sensor of the tracking device is activated, each of the RF communication module and the cellular communication module configured to transmit data to an appropriate receiver;
   sensing movement of the tracking device with the motion sensor of the tracking device;
   if the sensed movement is above a threshold level or after a timer has expired if there is no sensed movement, activating a vision sensor of the tracking device and environmental sensor(s) of the tracking device;
   further sensing movement and location of the tracking device with the motion sensor, the vision sensor and/or the environmental sensor(s); and
   if the sensed further movement and location is not inside an aircraft, activating the RF communication module and the cellular communication module to transmit data when the sensed further movement is above the threshold level or after the timer has expired, and if the sensed further movement and location is inside an aircraft, the RF communication module and the cellular communication module remaining deactivated.

* * * * *